US005781978A

United States Patent [19]

Fleming

[11] Patent Number: 5,781,978

[45] Date of Patent: Jul. 21, 1998

[54] DEVICE AND METHOD FOR DISASSEMBLING AND RE-ASSEMBLING A STEERING COLUMN

[76] Inventor: Leonard L. Fleming, 2711 W. Harrison, Chicago, Ill. 60612

[21] Appl. No.: 599,049

[22] Filed: Feb. 9, 1996

[51] Int. Cl.[6] ................................ B23P 6/00; B23P 19/04

[52] U.S. Cl. ........................ 29/402.03; 29/426.5; 29/257; 29/259; 29/266

[58] Field of Search .............................. 29/402.03, 426.5, 29/217, 218, 226, 227, 229, 256, 257, 258, 259, 266

[56] References Cited

U.S. PATENT DOCUMENTS 2,298,408 10/1942 Moyer ....................................... 29/259

4,398,706 8/1983 Kaulfuss .............................. 29/261 X

FOREIGN PATENT DOCUMENTS 216352 5/1924 United Kingdom ...................... 29/259

1603105 11/1981 United Kingdom ...................... 29/259

*Primary Examiner*—S. Thomas Hughes

*Attorney, Agent, or Firm*—Mathew R. P. Perrone, Jr.

[57] ABSTRACT

A device for disassembling and re-assembling a steering column has a reinforced arcuate housing with adjustable flanges at end of the housing. A central aperture in the housing provides for attaching to device to the steering column. The housing is reinforced with an upward flange.

16 Claims, 9 Drawing Sheets

DEVICE AND METHOD FOR DISASSEMBLING AND RE-ASSEMBLING A STEERING COLUMN

This invention relates to a device for disassembling and re-assembling a steering column, and more particularly to an arcuate, adjustable device for disassembling and re-assembling a steering column.

BACKGROUND OF THE INVENTION

In a modern or newer vehicle, a number of vehicle operating or control items are mounted on and within the steering column. Customarily, a control or a switch for each item is also mounted on the steering column. If an item or a switch therefor malfunctions, repair can be difficult.

To repair an item or switch related to the steering column, the steering wheel must be removed. Then items within the steering column must be disassembled. The locking plate holding the items within the steering column is very difficult to remove.

For example, a vehicle may have an ignition switch mounted on the steering column. This ignition switch serves to lock the steering wheel in place and provide an additional safety measure in order to at least delay, if not prevent, theft of a vehicle. However, when an ignition switch or other component in the steering column malfunctions, it is difficult to remove the device and replace or repair the ignition switch.

It is very desirable to accomplish this in an efficient manner. The steering column is assembled with a lock plate and a snap ring. A device must be designed to hold down the lock plate, while the snap ring may be removed. This procedure can be complicated.

Many devices are known for removing this lock plate and snap ring. However, the known device suffers from difficulty of use and short useful life. A standard known device tends to lose its compression strength when its arms become weak and spread. The known device can also break under the extreme pressure required to be applied to the lock plate for removing of the spring clip.

It is also difficult to control and handle such a device while operating the features. The cramped quarters of operating on the steering wheel make it difficult for a second pair of hands to be available. It is desirable for such a device to be easily used by a single person and permit efficient use thereof.

Also, while certain features of steering columns have a common size, nevertheless, from model to model of vehicle, the steering column may differ sufficiently so as to require a different device to achieve the compression aspects and removal aspects. It is desirable to provide one device that can be used in a plurality of different steering columns for this particular purpose. The available devices for removing the lock plate lack this consistency.

FIG. 1 depicts an exploded view of a standard steering column 100. The steering column 100 is shown as a typical steering column, which can be adapted to fit any number of vehicles by minor adjustments. It includes a steering housing 102. Extending from the steering housing 102 is a turn signal control lever 104. Centrally located in the housing 102 is a steering shaft 106. Around the steering shaft 106 is mounted an upper bearing spring 108.

Over the upper bearing spring 108 is mounted the turn signal cancelling cam 110. Over the turn signal cancelling cam 110 is mounted the lock plate 112. The lock plate 112 is held in place by a locking snap ring 114 that fits around the around steering shaft 106 and compresses upper bearing spring 108. The steering shaft nut 116 then may secure the steering wheel (not shown) to the steering shaft 106.

Depicted in FIG. 2, the standard compression tool 120 of the prior art includes a U-shaped member 122. U-shaped member 122 includes a flat base 124, a flat first arm 126 and a flat second arm 128. Flat first arm 126 and flat second arm 128 are mutually parallel and extend from flat base 124.

Flat base 124 receives a threaded bolt 130 through threaded receiver 132. Threaded receiver 132 is centrally located threaded member. Threaded bolt 130 includes a gripping rod 134 to fit down over the steering shaft 106. As the threaded bolt 130 is cranked down the U-shaped member 122 compresses the lock plate 112 and the upper bearing spring 108 permitting the snap ring 114 to be removed.

As shown in FIG. 3, application of a wrench 136 to the U-shaped member 122 is the beginning of the end for the u-shaped tool 120. The u-shaped tool 120 becomes relatively ineffective, because the flat first arm 126 and flat second arm 128 of the U-shaped member 122 tend to bend with fatigue after a few uses. When this happens, the compression of upper bearing spring 108 is not achieved and it becomes difficult, if not impossible, to remove the locking snap ring 114, which holds the lock plate 112 in place.

Thus, the tool of the prior art, has a sufficient number of deficiencies to make a tool such as u-shaped tool 120 ineffective. It is highly desirable to provide a more efficient tool which is easier to use. If such a tool is easy to manufacture, the advantages increase geometrically.

OBJECT OF THE INVENTION

Therefore, among the many objectives of this invention is to provide a device for disassembling and re-assembling a steering column having an arcuate housing with adjustability to fit a number of steering columns.

A further objective of this invention is to provide a device for disassembling and re-assembling a steering column having a long useful life.

A still further objective of this invention is to provide a device for disassembling and re-assembling a steering column having a simplified use procedure.

Yet a further objective of this invention is to provide a device for disassembling and re-assembling a steering column, which permits simplified removal of the locking plate.

Also an objective of this invention is to provide a device for disassembling and re-assembling a steering column, which may be used on a number of different steering columns.

Another objective of this invention is to provide a device for disassembling and re-assembling a steering column, which may be used easily used in cramped quarters.

Yet another objective of this invention is to provide a method for disassembling and re-assembling a steering column.

These and other objectives of the invention (which other objectives become clear by consideration of the specification, claims and drawings as a whole) are met by providing a device having a reinforced arcuate housing with adjustable flanges at each end of the housing, the device having a centrally located aperture for use with a steering column.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
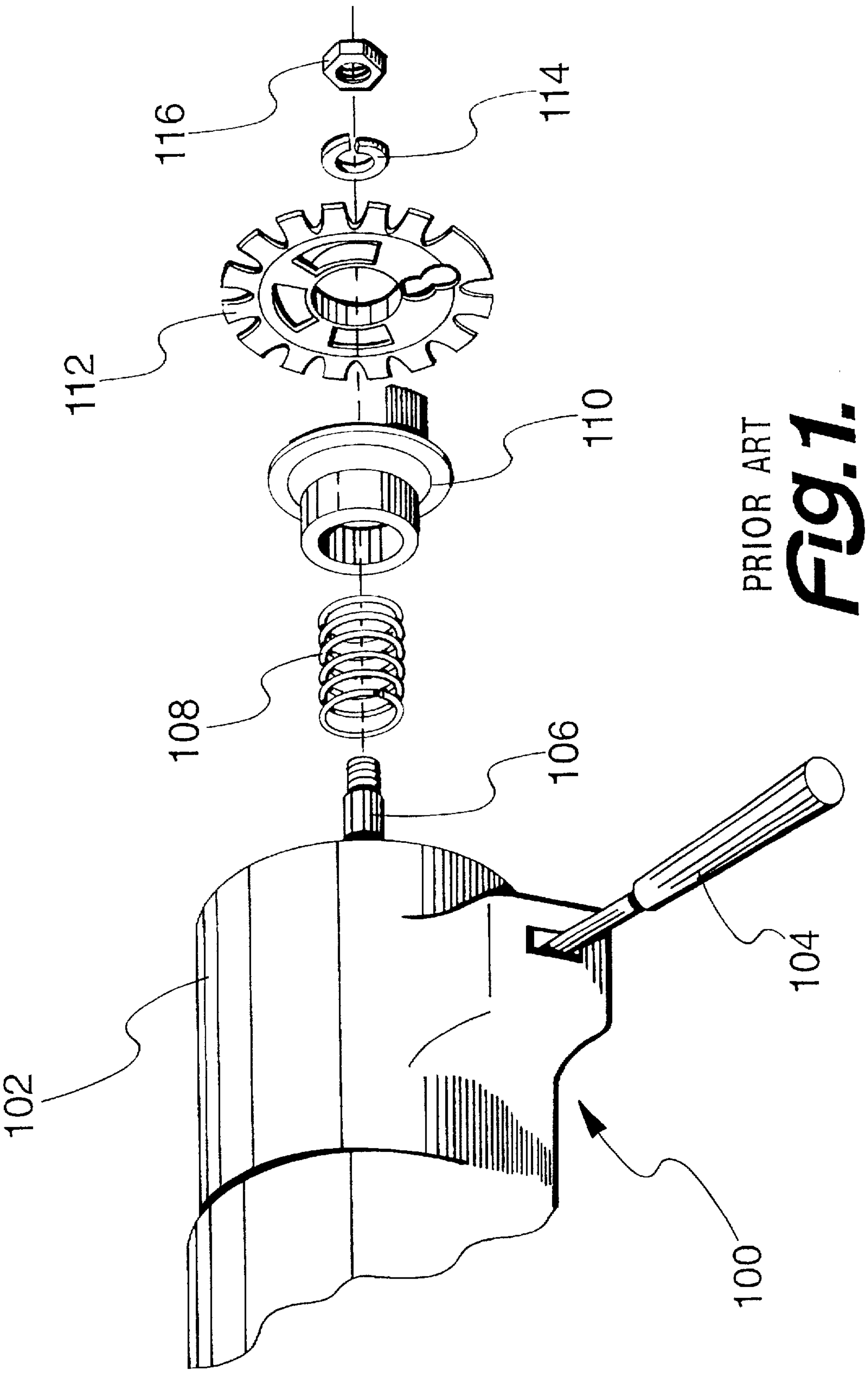
PRIOR ART Fig.1.
FIG. 1 depicts an exploded perspective view of steering column 100.

The device for disassembling and re-assembling a steering column includes an arcuate housing with adjustable flanges at each end thereof and a centrally located mounting device. The mounting device is centrally located in the arcuate housing and is a post aperture. The post aperture mounts the housing on the steering post by receiving the steering post through the aperture.

The arcuate housing is a generally flat, substantially rectangular piece of metal or similarly durable material shaped as an arc. The long edges of the rectangle form the edges of the arc. Preferably, the arc is roughly a half circle or a little less than a half circle.

The housing includes an upward lip along one edge thereof, that is on one long side of the rectangle. This upward lip provides strength and prevents bending of the device during use. Such lack of bending greatly increases the useful life of the device. The upward lip is preferably at substantially a right angle to the arc.

Attached at each end of the arcuate housing is an adjustable flange. Each adjustable flange cooperates with the other to permit the device to be adapted to fit any suitable size steering post. The adjustable flange is held in place by a snap ring method, a wing nut set-up, or any other suitable holding device, which positions the adjustable flanges on the end of the arcuate housing.

Each flange is also a flat piece of metal. The flange is much shorter than the housing, with a reasonable flange arc thereto. The flange arc permits sliding of the flange within the housing.

In use, the steering wheel is removed. The device is inserted over the rod. The flanges are then adjusted to fit the column and lock plate. Appropriate pressure is applied through the steering rod by the aperture pressed downwardly on the device. The pressure is applied by a tightening of a nut on the steering rod and over the device, thereby forcing the flanges against the locking plate.

As the locking plate is pressed downwardly, the upper bearing spring is compressed by the downward motion of the locking plate. As the upper bearing spring is depressed the snap ring is exposed. The snap ring, which holds the locking plate on the steering rod, may then be removed. This removal provides an access to the desired part of or within the steering column, which needs to be repaired or replaced. In this fashion, great advantages are obtained.

After the desired part has been repaired or replaced, it is possible to use the device of this invention to reassemble the steering column. All parts are replaced. The upper bearing spring and locking can be depressed while the locking snap ring is reapplied. The device can then be released and the steering wheel replaced in a standard fashion.

If it desired to fit more steering columns, it is possible to achieve that goal by adjusting the size of the arcuate housing and the flanges. So while one size of the device may fit most steering columns, the size adjustment is all that is required to fit the remainder of steering columns.

Figure 2:
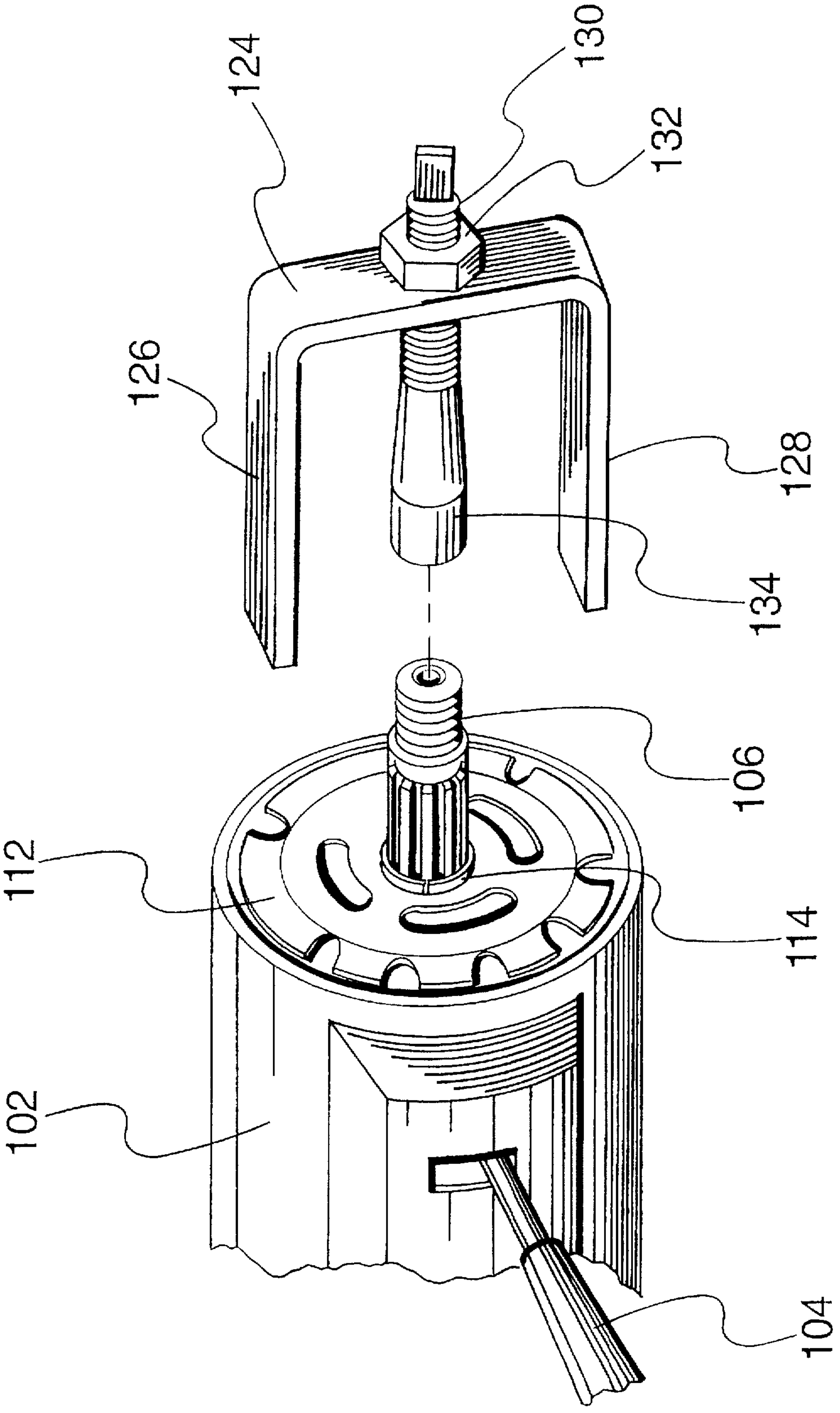
PRIOR ART Fig.2.
FIG. 2 depicts a perspective view of steering column 100 with u-shaped tool 120 of the prior art.
Figure 3:
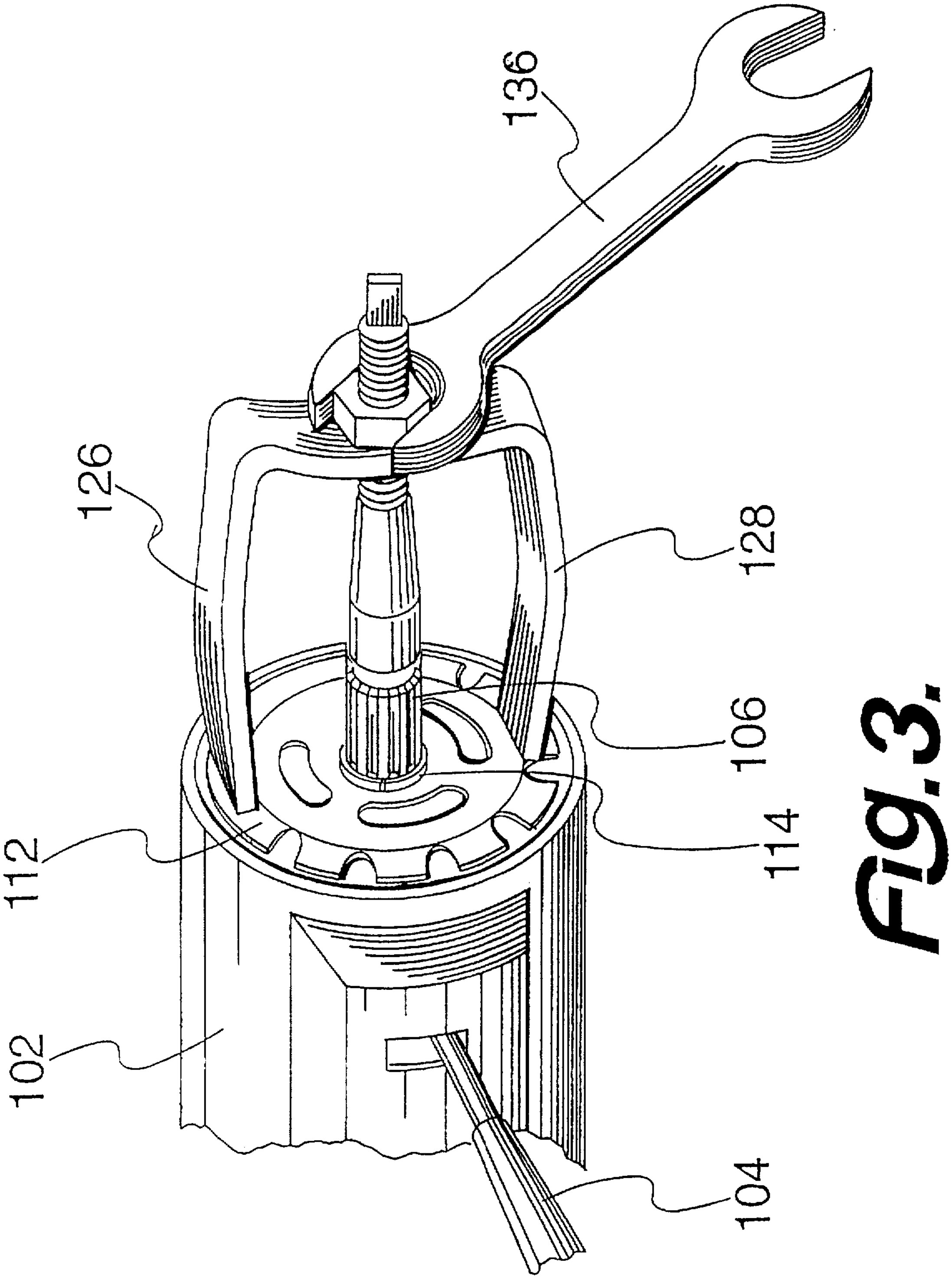
FIG. 3 depicts a perspective view of steering column 100 using u-shaped tool 120 of the prior art.

Having discussed FIG. 1, FIG. 2, and FIG. 3 with regard to the prior art, it is now desirable to discuss the device of this invention.

Figure 4:
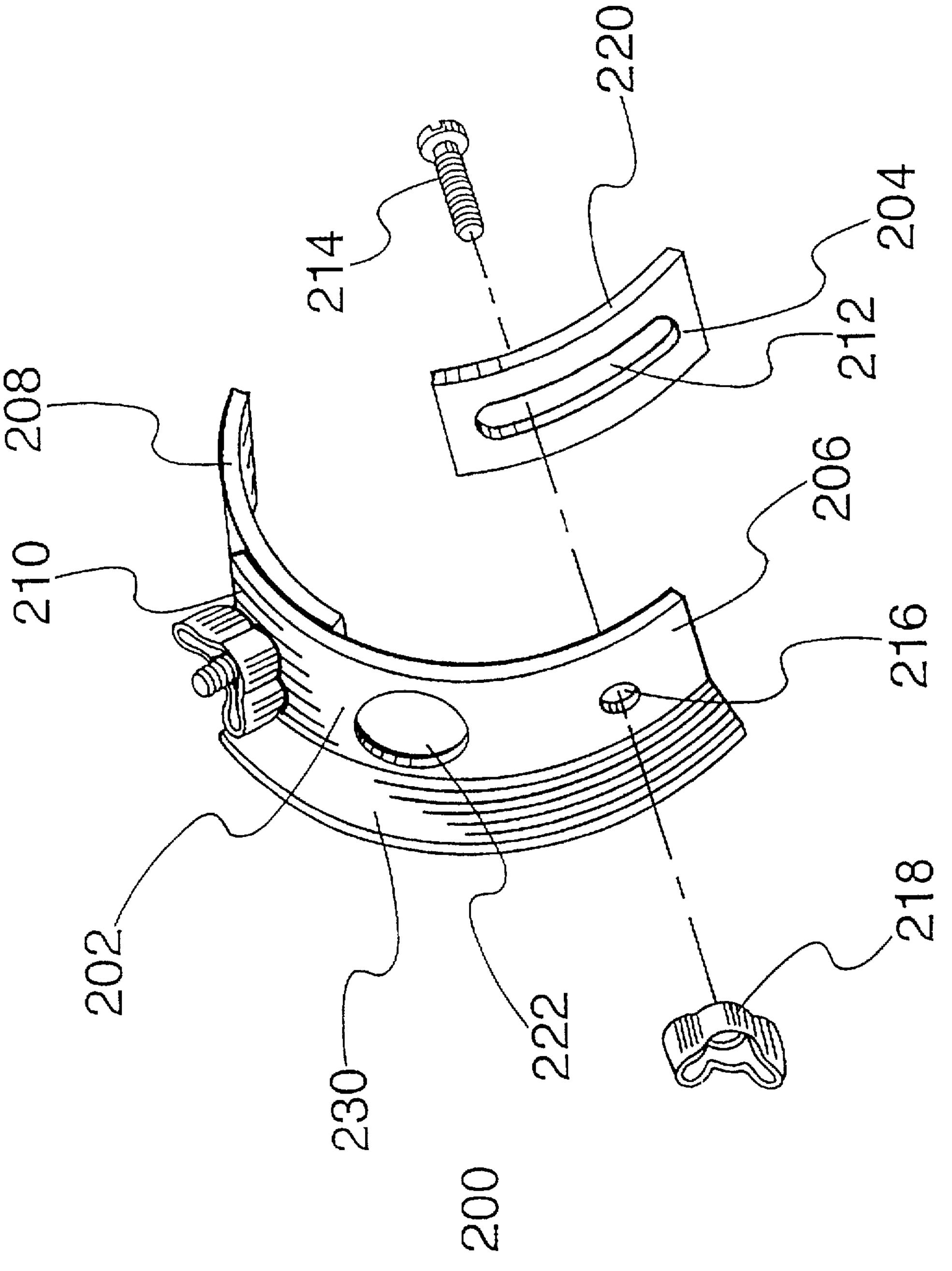
FIG. 4 depicts an exploded perspective view of arcuate device 200 of this invention.
Figure 5:
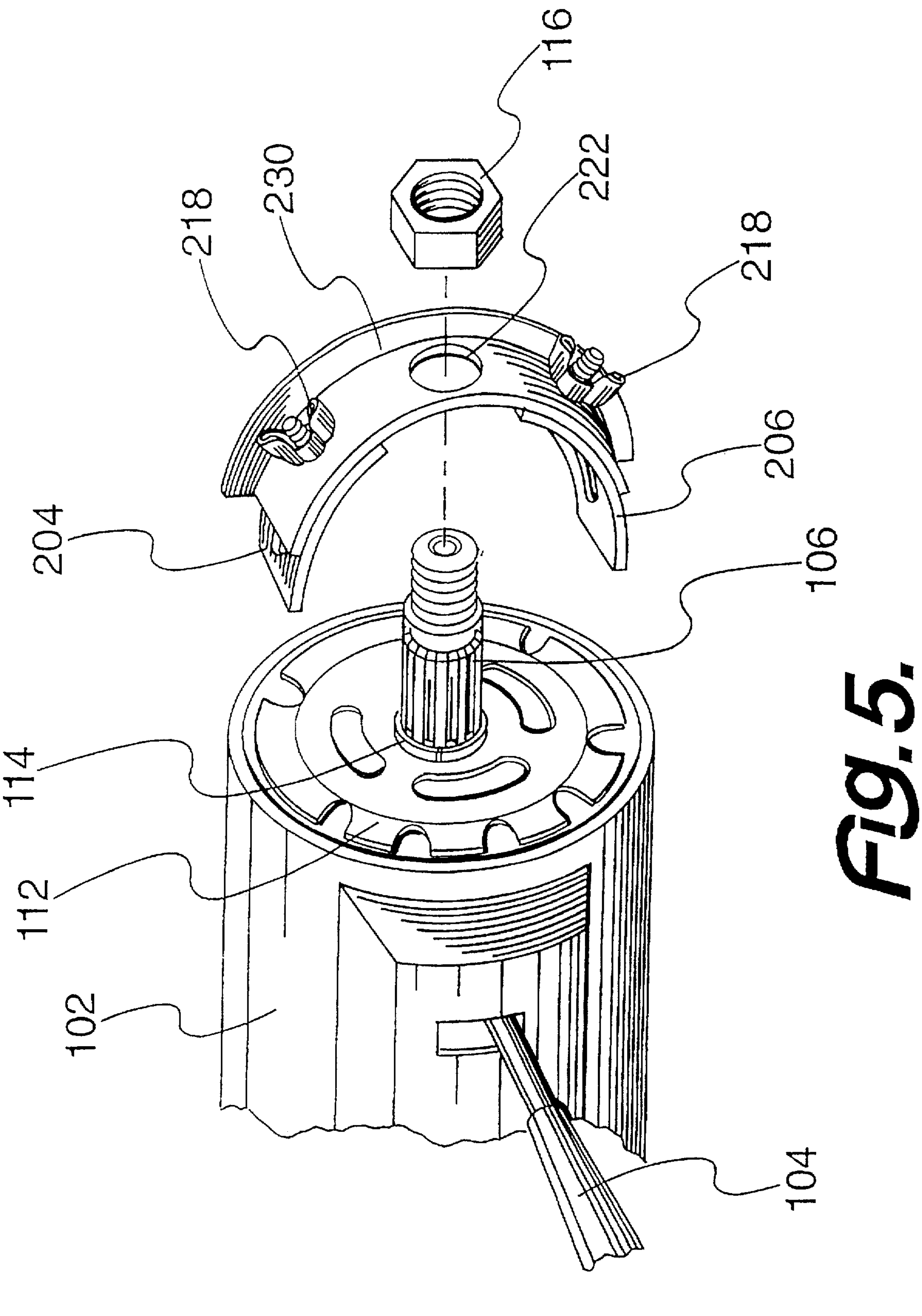
FIG. 5 depicts a perspective view of steering column 100 with arcuate device 200 of this invention.

In FIG. 4, the device for disassembling and reassembling a steering column (hereafter sometimes referred as steering column device 200) includes an arcuate housing 202 with a first adjustable flange 204 at a first arc end 206 thereof. Similarly arcuate housing 202 with a second adjustable flange 208 at a second arc end 210, thereof. First adjustable flange 204 and second adjustable flange 208 are similar in structure.

First adjustable flange 204 and second adjustable flange 208 are attached at first arc end 206 and second arc end 210 of the arcuate housing 202 to provide adjustability for the device 200. Each adjustable flange 204 and 208 cooperates with the other to permit the device to be adapted to fit any suitable size steering column 100.

Each adjustable flange 204 and 208 is held in place by a snap ring method, a wing nut set-up, or any other suitable holding device, which positions them on the arcuate housing 202. Preferably both adjustable flanges 204 and 208 include a flange slot 212. Flange slot 212 receives a slot bolt 214.

Arcuate housing 202 includes a bolt aperture 216 adjacent to each of first arc end 206 and second arc end 210 to receive slot bolt 214 after slot bolt 214 has passed through flange slot 212. A wing nut 218 or fastener combine with slot bolt 214 and flange slot 212 to provide adjustment of adjustable flanges 204 and 208.

Each flange 204 and 208 is also a flat piece of metal. Each flange 204 and 208 is much shorter than the housing 202, with a reasonable flange arc 220 thereto. The flange arc 220 permits sliding of each flange within the housing 202.

The arcuate housing 202 is generally a flat piece of metal or similarly durable material shaped as an arc. Preferably, the arc is roughly a half circle or a little less than a half circle. The housing 202 includes an upward lip 230 along one edge thereof. This upward lip 230 provides strength and prevents bending of the device 200 during use. Such lack of bending greatly increases the useful life of the device 200.

Adding FIG. 5, FIG. 6, FIG. 7 and FIG. 8 to the consideration, centrally located within the housing 202 is a post aperture 222. The post aperture 222 mounts the housing 202 on the steering column 100 is an aperture by receiving the steering shaft 106.

In use, the steering wheel (not shown) is removed from the steering column 100. The device 200 is inserted over the rod or steering shaft 106. The flanges 204 and 208 are then adjusted to fit the column 100 and lock plate 112. Appropriate pressure is applied through the steering shaft 106 at the post aperture 222 and shaft nut 116 pressed downwardly on the device 200 and the lock plate 112. The pressure is applied by a tightening of the shaft nut 116 over the device 200 forcing the flanges 204 and 208 against the lock plate 112.

As the lock plate 112 is pressed downwardly, the snap ring 114 may be removed by screw driver 138 and access may be obtained to the desired part in the steering column 100, which needs to be repaired. In this fashion, great advantages are obtained.

Figure 9:
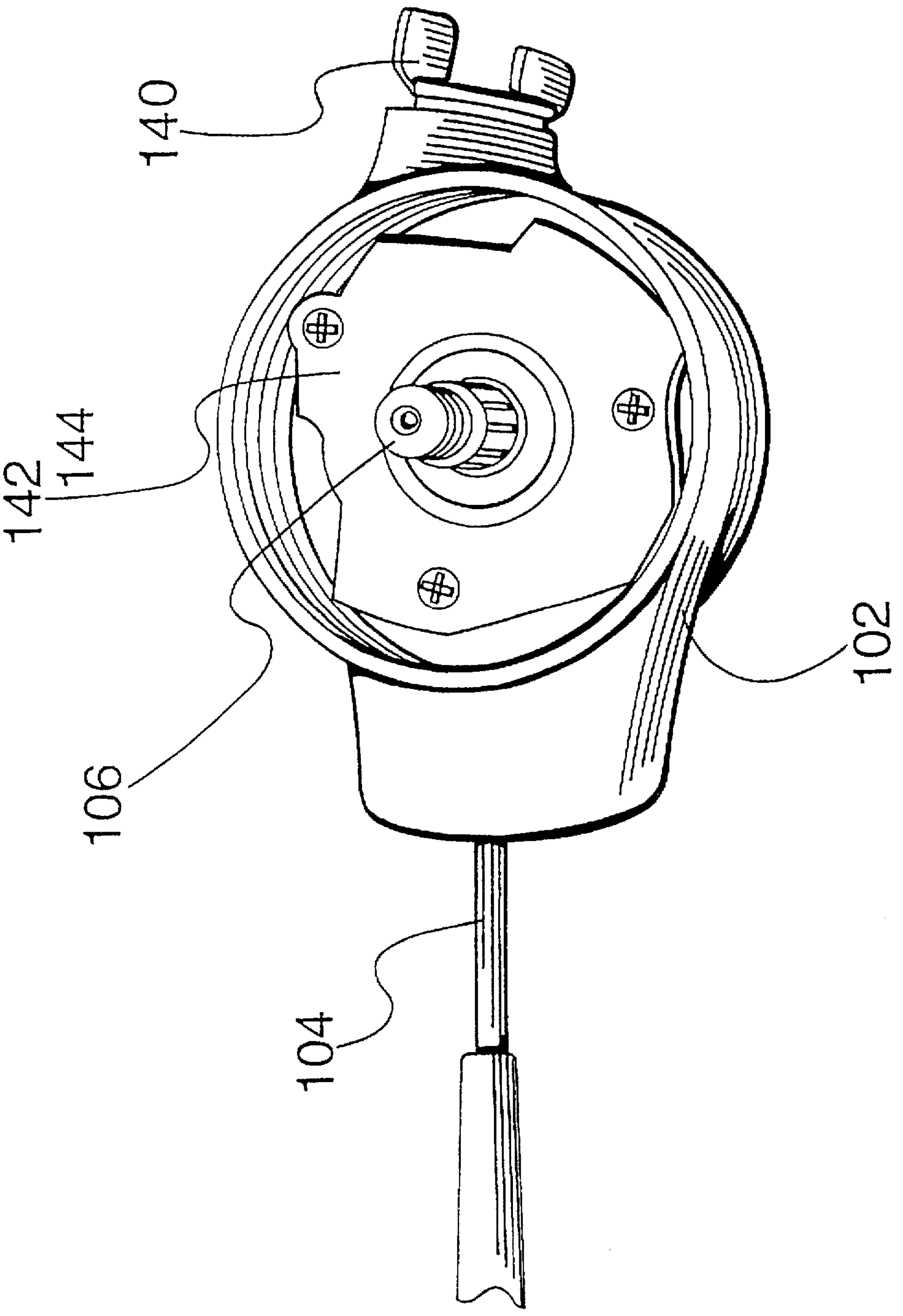
FIG. 9 depicts a top perspective view of steering column 100 after use of with arcuate device 200.

Adding FIG. 9 to the consideration, once the snap ring 114 and the lock plate 112 are removed, ignition key socket 140, turn signal switch 142, hazard warning switch 144, and other items in steering column are exposed for repair. These features may be acted upon by removing screws 150.

In the following examples, it is intended to illustrate without unduly limiting the invention.

EXAMPLE ONE

In a vehicle (not shown) which has an ignition key socket such as the ignition key socket 140 inoperable, the steering wheel (not shown) is removed to provide access to the lock plate 112 and ignition key socket 140 using the u-shaped tool 120. The procedure exemplified in FIG. 3 is carried out. Disassembly and re-assembly of ignition key socket 140 consumes seven hours. During reassembly, u-shaped tool 120 breaks.

EXAMPLE TWO

Figure 6:
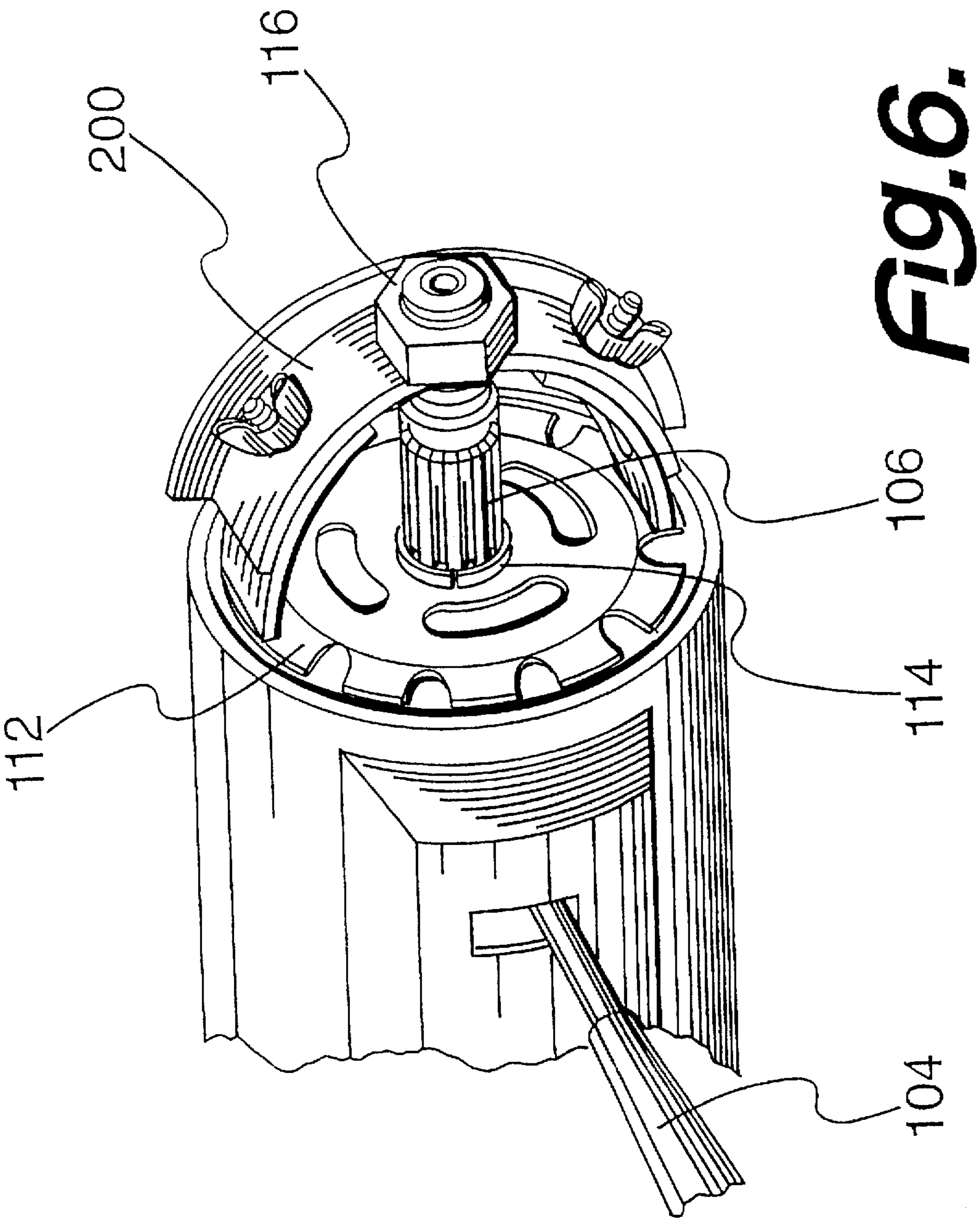
FIG. 6 depicts a perspective view of steering column 100 using arcuate device 200 of this invention.
Figure 7:
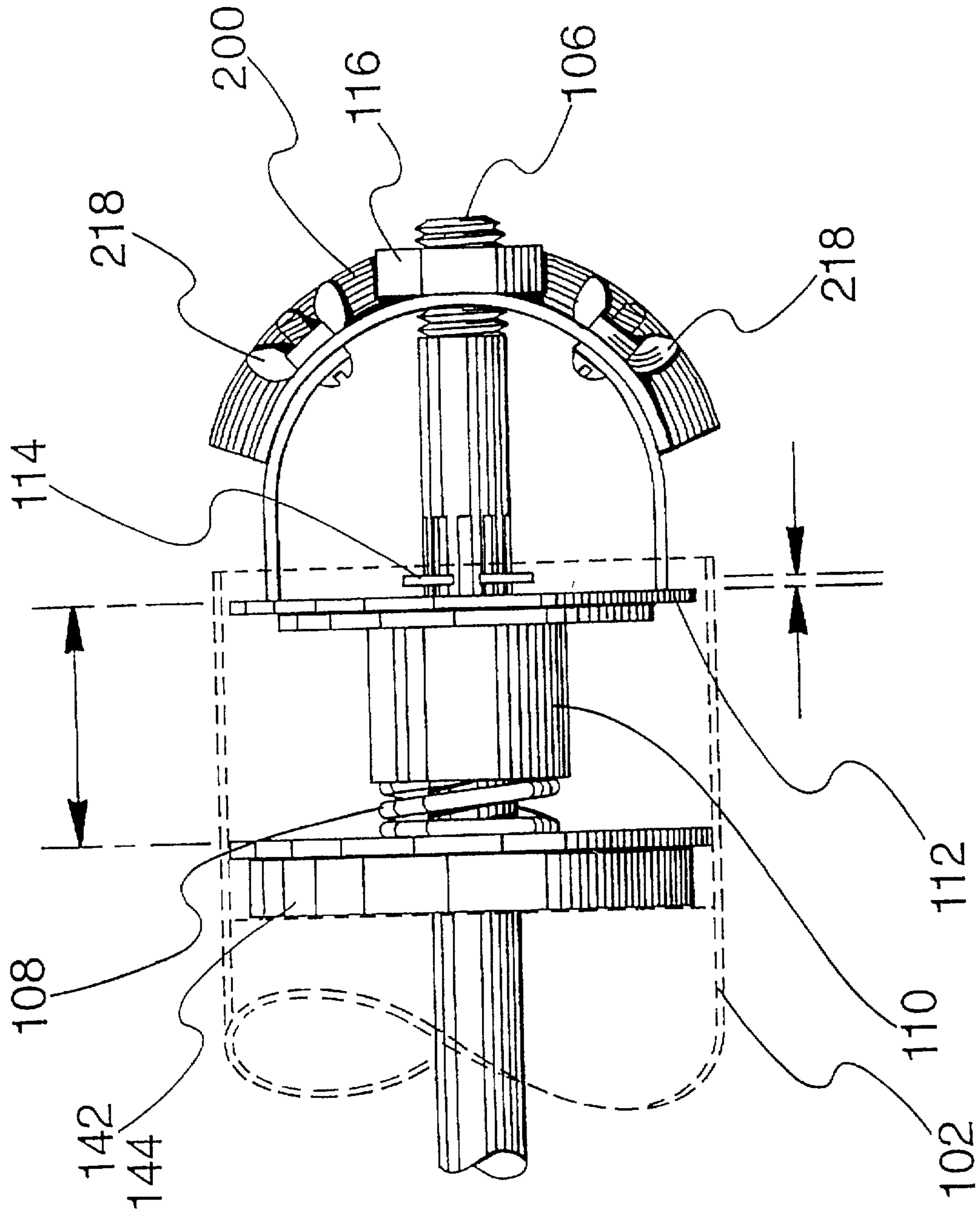
FIG. 7 depicts a side view of steering column 100 using arcuate device 200 of this invention.
Figure 8:
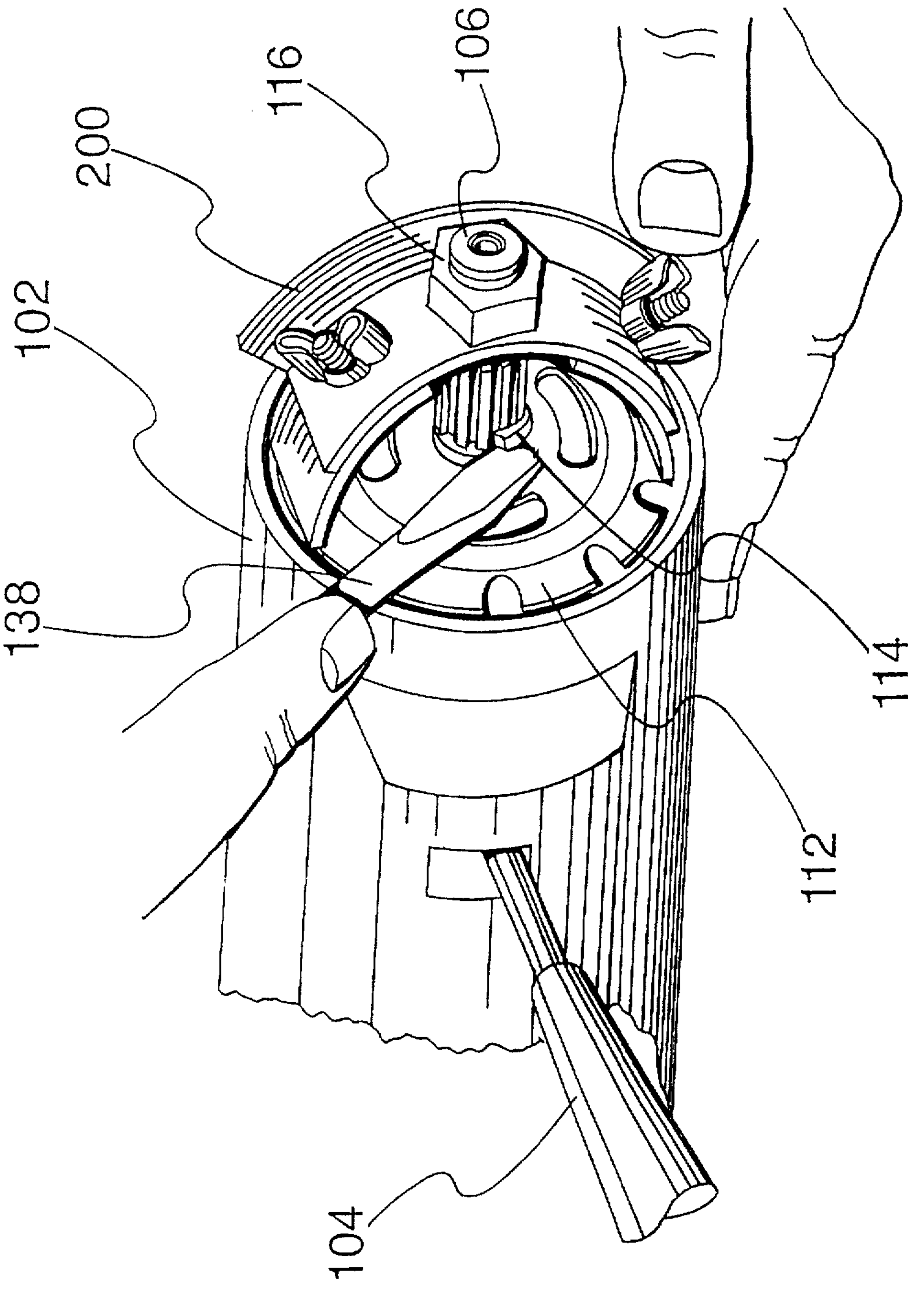
FIG. 8 depicts a perspective view of steering column 100 with arcuate device 200 of this invention tightened thereon.

The procedure of Example 1 is repeated using the arcuate device 200 of this invention. The procedure exemplified in FIG. 6 is carried out. Disassembly and re-assembly of ignition key socket 140 consumes thirty minutes. Reassembly is accomplished as shown in FIG. 7. Upper bearing spring 108 is compressed during disassembly or re-assembly so that locking snap ring 114 can be applied or removed as desired.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A device for assisting in disassembly and re-assembly of a steering column comprising:

a reinforced arcuate housing and an adjusting means mounted thereon;

the reinforced arcuate housing having a first end and a second end;

the adjusting means including a first adjustable flange and a second adjustable flange;

the first adjustable flange being movably mounted at the first end of the reinforced arcuate housing;

the second adjustable flange being movably mounted at the second end of the reinforced arcuate housing;

the first end of the reinforced arcuate housing including a first mounting aperture;

the second end of the reinforced arcuate housing including a second mounting aperture;

the first adjustable flange including a first flange slot therethrough;

the second adjustable flange including a second flange slot therethrough;

the first mounting aperture cooperating with the first flange slot to secure the first adjustable flange to the housing;

the second mounting aperture cooperating with the second flange slot to secure the second adjustable flange to the housing;

the arcuate housing being a generally flat, substantially rectangular piece of durable material shaped as an arc; and a long edge of the rectangular piece forming an upward lip to provide additional strength for the housing.

2. The device for assisting in disassembly and re-assembly of a steering column of claim 1 further comprising:

a first nut and bolt assembly cooperating with the first mounting aperture and the first flange slot to secure the first adjustable flange to the housing; and a second nut and bolt assembly cooperating with the second mounting aperture and the second flange slot to secure the second adjustable flange to the housing.

3. The device for assisting in disassembly and re-assembly of a steering column of claim 1 further comprising:

the arcuate housing having a post aperture; and the post aperture being adapted to receive a steering post of the steering column in order to disassemble or reassemble a steering column.

4. The device for assisting in disassembly and re-assembly of a steering column of claim 1 further comprising:

a first nut and bolt assembly cooperating with the first mounting aperture and the first flange slot to secure the first adjustable flange to the housing; and a second nut and bolt assembly cooperating with the second mounting aperture and the second flange slot to secure the second adjustable flange to the housing.

5. The device for assisting in disassembly and re-assembly of a steering column of claim 4 further comprising:

the arcuate housing having a post aperture; and the post aperture being adapted to receive a steering post of the steering column in order to disassemble or reassemble a steering column.

6. The device for assisting in disassembly and reassembly of a steering column of claim 5 further comprising a nut of the first nut and bolt assembly and the second nut and bolt assembly being a wing nut.

7. The device for assisting in disassembly and re-assembly of a steering column of claim 5 further comprising:

the first adjustable flange and the second adjustable flange both being a rectangularly shaped, shorter flat piece of durable, substantially rigid material;

the shorter flat pieces being shorter than the housing; and the shorter flat pieces having an arc compatible with the housing.

8. In a method for providing an access to at least one part housed in a steering column, the steering column including a steering housing, a turn signal control lever extending from the steering housing, a steering shaft centrally located in the steering housing, an upper bearing spring around the steering shaft, a turn signal cancelling cam being mounted over the upper bearing spring, a lock plate being mounted over the turn signal cancelling cam, and a holding ring mounted on the steering shaft and holding the lock plate in position; the improvement comprising:

providing a device for assisting in disassembly and re-assembly of the steering column, the device including a reinforced arcuate housing and an adjusting means mounted thereon, the reinforced arcuate housing having a first end and a second end, the adjusting means including a first adjustable flange and a second adjustable flange, the first adjustable flange being movably mounted at the first end of the reinforced arcuate housing, and the second adjustable flange being movably mounted at the second end of the reinforced arcuate housing;

inserting the device over the steering rod;

applying pressure through the device to the lock plate;

removing the holding ring;

positioning the first adjustable flange and the second adjustable flange to contact the lock plate;

providing a post aperture for the arcuate housing; and placing the post aperture over the steering post.

9. The method of claim 8, further comprising:

positioning the first adjustable flange and the second adjustable flange on the locking plate of the steering column;

applying pressure to the locking plate on the first adjustable flange and the second adjustable flange; and exposing the holding ring prior to removing the holding ring.

10. The method of claim 9, further comprising:

removing the locking plate after removing the holding ring;

obtaining access to the steering column; and adjusting a part within the steering column.

11. The method of claim 10, wherein the step of adjusting a part comprises repairing the part.

12. The method of claim 10, wherein the step of adjusting a part comprises replacing the part.

13. A device for assisting in disassembly and re-assembly of a steering column comprising:

the device including a reinforced arcuate housing and an adjusting means mounted thereon;

the reinforced arcuate housing having a first end and a second end;

the adjusting means including a first adjustable flange and a second adjustable flange;

the first adjustable flange being movably mounted at the first end of the reinforced arcuate housing;

the second adjustable flange being movably mounted at the second end of the reinforced arcuate housing;

the first end of the reinforced arcuate housing including a first mounting aperture;

the second end of the reinforced arcuate housing including a second mounting aperture;

the first adjustable flange including a first flange slot therethrough;

the second adjustable flange including a second flange slot therethrough;

the first mounting aperture cooperating with the first flange slot to secure the first adjustable flange to the housing;

the second mounting aperture cooperating with the second flange slot to secure the second adjustable flange to the housing;

the arcuate housing having a post aperture;

the post aperture being adapted to receive a steering post of the steering column in order to disassemble or reassemble a steering columns;

a first nut bolt assembly cooperating with the first mounting aperture and the first flange slot to secure the first adjustable flange to the housing;

a second nut bolt assembly cooperating with the second mounting aperture and the second flange slot to secure the second adjustable flange to the housing;

the arcuate housing being a generally flat, substantially rectangular piece of durable material shaped as an arc; and a long edge of the rectangular piece forming an upward lip to provide additional strength for the housing.

14. The device for assisting in disassembly and re-assembly of a steering column of claim 13 further comprising:

a first nut and bolt assembly cooperating with the first mounting aperture and the first flange slot to secure the first adjustable flange to the housing; and a second nut and bolt assembly cooperating with the second mounting aperture and the second flange slot to secure the second adjustable flange to the housing.

15. The device for assisting in disassembly and re-assembly of a steering column of claim 14 further comprising a nut of the first nut and bolt assembly and the second nut and bolt assembly being a wing nut.

16. The device for assisting in disassembly and re-assembly of a steering column of claim 15 further comprising:

the first adjustable flange and the second adjustable flange both being a rectangularly shaped, shorter flat piece of durable, substantially rigid material;

the shorter flat pieces being shorter than the housing; and the shorter flat pieces having an arc compatible with the housing.

* * * * *